United States Patent [19]

Li

[11] Patent Number: 4,799,269

[45] Date of Patent: Jan. 17, 1989

[54] TABLE LOOKUP ADDRESSING BY DICHOTOMY WINDOW GENERATION

[75] Inventor: Hungwen Li, Pleasantville, N.Y.

[73] Assignee: International Business Machines Corporation, Armonk, N.Y.

[21] Appl. No.: 15,840

[22] Filed: Feb. 18, 1987

[51] Int. Cl.$^4$ .............................................. G06K 9/56
[52] U.S. Cl. ..................................... 382/27; 364/900; 382/49
[58] Field of Search ........................... 382/27, 41, 49; 364/200, 900, 134

[56] References Cited

U.S. PATENT DOCUMENTS

| | | | |
|---|---|---|---|
| 4,090,174 | 5/1978 | Van Voorhis | 340/146.3 MA |
| 4,438,495 | 3/1984 | Collins et al. | 364/414 |
| 4,506,382 | 3/1985 | Hada et al. | 382/27 |
| 4,534,059 | 8/1985 | Yamada | 382/54 |
| 4,541,116 | 9/1985 | Lougheed | 382/49 |
| 4,606,066 | 8/1986 | Hata et al. | 382/49 |

Primary Examiner—E. A. Goldberg
Assistant Examiner—Lincoln Donovan
Attorney, Agent, or Firm—Carl C. Kling; Philip J. Feig

[57] ABSTRACT

Table lookup for an $N \times N$ image on an $M \times M$ 2D array is speeded by enhancing an address word to access table entries greater in number than the address word bit structure normally permits. This is done by organizing a 2D array ($M \times M$) as a 8-interconnected array, decomposing the $N \times N$ array into $N/M \times N/M$ subimages, and generating and enhancing dichotomy windows of size $K \times K$ at the subimage level as table lookup addresses. For arbitrary combinations of M, N and K, the address word is broken into two dichotomies, and each dichotomy is altered by incrementing and decrementing. This provides multi-bit addressing for sufficient table entries to carry out in a single cycle the complex table lookup required for processing a multi-bit (i.e., $3 \times 3$) window. The output of a programmable logic array accesses four quadrants of memory. The current pixel number CPN is made available from the computer control. This is divided into two halves, HCPN and LCPN, which are incremented or decremented to form signals IHCPN, ILCPN, DHCPN and DLCPN. Carry and borrow signals CIH and BDH, respectively, are concatenated with the other signals to provide the requisite number of table addresses. Address 00, for example, is HCPN when CIH=0. Addresses for the other memory banks are derived similarly.

3 Claims, 6 Drawing Sheets

| 0 1 — — — 15 | 16 — — — — 31 | 32 — — — — 47 | 48 — — — 63 |
|---|---|---|---|
| 64 65 — — — <br> ⎸ <br> ⎸ <br> 448 — — — 463 | | | 127 <br> ⎸ <br> ⎸ |
| | | | |
| | | | |
| ⎸ <br> ⎸ <br> 4032 — — — | | | ⎸ <br> ⎸ <br> — — — — 4095 |

FIG. 4

| 255 | 240 — — — — — — 255 | 240 |
|---|---|---|
| 15 | 0 1 2 — — — — — 15 | 0 |
| 31 <br> ⎸ <br> ⎸ <br> ⎸ <br> 255 | 16 17 18 — — — — —31 <br> ⎸ <br> ⎸ <br> ⎸ <br> 240 — — — — — — 255 | 16 <br> ⎸ <br> ⎸ <br> ⎸ <br> 240 |
| 15 | 0 1 2 — — — — —15 | 0 |

TABLE LOOKUP ADDRESSING BY DICHOTOMY WINDOW GENERATION

BACKGROUND OF THE INVENTION

1. Field of the Invention

This invention relates to array processing of neighborhood images, and more particularly relates to table lookup addressing of N×N images by addressing larger images through dichotomy windows, that is, through manipulating a multi-bit address into multiple addresses each of fewer bits.

2. Description of the Prior Art

Image processors of the pipeline type are inherently capable of easy segregation of a 3×3 neighborhood window, and are inherently fast because no memory access cycle is required during processing. Table lookup in a two-dimensional array normally is very much slower than image processing in a pipelined processor, in a range roughly 1:9, because each pixel of the nine-pixel 3×3 neighborhood window requires a memory cycle.

The following publications are representative of the prior art:

U.S. Pat. No. 4,090,174, Van Voorhis, METHOD AND APPARATUS FOR ACCESSING HORIZONTAL SEQUENCES, VERTICAL SEQUENCES AND RECTANGULAR SUBARRAYS FROM AN ARRAY STORED IN A MODIFIED WORD ORGANIZED RANDOM ACCESS MEMORY SYSTEM, May 16, 1978, shows an image processor, for a 2D array, which allows direct access to subarrays without requiring that the desired cluster of bits all fall within the same memory word.

U.S. Pat. No. 4,506,382, Hada et al, APPARATUS FOR DETECTING TWO-DIMENSIONAL PATTERN AND METHOD FOR TRANSFORMING THE PATTERN INTO BINARY IMAGE, Mar. 19, 1985, shows detecting apparatus for comparing a 3×3 neighborhood image window on the basis of binary signals stored in a register. This permits the breakdown of a 2D array into the desired 3×3 neighborhood windows.

U.S. Pat. No. 4,438,495, Collins et al, TOMOGRAPHY WINDOW-LEVEL GAMMA FUNCTIONS, Mar. 20, 1984, shows window subimage processing using table lookup. There is a memory table of gamma correction values in a first memory. A counter generates a sequence of addresses in a second memory. A variable address generator addresses the first memory to send gamma correction data to the second memory at locations which is corrected.

U.S. Pat. No. 4,534,059, Yamada, METHOD FOR CORRECTING GRADATION OF OUTPUT DATA, FOR USE IN A PICTURE DIGITAL PROCESSING SYSTEM, Aug. 6, 1985, shows multiple lookup table memories used in image processing, operating by using a first lookup table to insert address corrections for accessing a second lookup table.

U.S. Pat. No. 4,541,116, R. M. Lougheed, NEIGHBORHOOD IMAGE PROCESSING FOR IMPLEMENTING FILTERING OPERATIONS, Sept. 10, 1985, shows a technique of reviewing the pixels in a neighborhood image to form a table lookup address to accomplish a transform of the neighborhood image.

Two competing architectures exist for image processing/computer vision; they are the pipelined architecture and the 2D array architecture. For the very important neighborhood operations of image processing/computer vision, the pipelined architecture is superior due to its capability to form a 3×3 window then use the window to perform a table lookup. In this respect, the pipelined architecture is 9 times faster than its 2D array counterpart with other factors equivalent.

The table-lookup from a 3×3 window can be stated formally as follows:

Given an N×N binary image organized as a two-dimensional array of pixels P(s, t) where both s and t run from 0 to N−1, and a table with 512 1-bit entries (entry 0 to entry 511), the output of the table-lookup of a pixel P(i, j) is the content of the table at location TADDR(0:8) where TADDR(0:8) is an integer ranging from 0 to 511 and each TADDR(k) (k from 0 to 8) is a bit to be assigned by the value of a pixel in the 3×3 window.

The assignment is as following: TADDR(0)=P(i−1, j−1), TADDR(1)=P(i−1, j), TADDR(2)=P(i−1, j+1), TADDR(3)=P(i, j−1), TADDR(4)=P(i, j), TADDR(5)=P(i, j+1), TADDR(6)=P(i+1, j−1), TADDR(7)=P(i+1, j) and TADDR(8)=P(i+1, j+1) where the i and j indices run from 1 to N−2.

Performing window formulation and the table lookup in one memory cycle is not directly possible for a 2D array, due to the lack of bits required for the window address generation, due to shortage of bandwidth in the communication path, and due to difficulty of the control for the address generation and communication path.

The prior art thus teaches a variety of reasons for manipulating table lookup addresses, and a variety of mechanisms for doing so, but the prior art does not teach nor suggest the invention, which provides an expanded address set to access the memory tables necessary to provide the bits of the desired neighborhood image.

SUMMARY OF THE INVENTION

This invention devises a window generation scheme for a 2D array to form a 3×3 window and to support the table lookup in one memory cycle; a 9:1 speedup can be accomplished. Table lookup, which can be very fast in an image processor because the neighborhood image can be used directly as a table address, can be speeded in a N×N 2D array processor by decomposing the M×M array into sixteen M/N×M/N subimage cells, and using dichotomy window generation at the subimage cell level in implementing the table lookup. This technique for generating windows, at the subimage cell level, is relatively straightforward once addressing capability is extended. Addressing capability is extended by dichotomy window generation. The major cost, other than the relatively small cost of dichotomy window generation mechanisms, is that decomposing the array raises the problem that special handling is necessary for a neighborhood at the edge of the subimage cell. This is true particularly for a neighborhood at the corner of the subimage cell.

The image is divided up into subimage cells of finite size M/N×M/N, (e.g. 16×16.) A log (M/N×M/N)-bit word can address the entire subimage, but an eight-bit byte cannot directly address the larger original image because there are no bits left over to select among the various cells. The dichotomy window generator accomplishes this addressing of the larger image, through manipulation of the address word and performing a table lookup. A dichotomy address generation block breaks the address word into dichotomies, in the preferred embodiment into two equal parts (this is always possible because log M/N×M/N) is always even); it increments each part, and decrements each part. This provides four sets, each set including two sub-addresses, and in addition provides two carry values and two borrow values. Each set of two sub-addresses provides the address bits necessary for accessing the entire subimage. While the carry and borrow specify which subimage cell holds the value for pixels at the edge of the subimage.

The object of the invention is to generate economically the addresses of m×m neighborhood windows. A feature of the invention is mechanism for dichotomy window generation, using manipulation of the bits for addressing a lookup table to extend the addressing capability of the bits beyond the actual capability of its inherent number of values.

An advantage of the invention is that it permits a classic computer to identify image processing windows at speeds rivalling those of image processors using arrays of processing elements.

Another advantage of the invention is that it computes table-lookup values for a 3×3 binary window in one machine cycle per pixel as compared with nine machine cycles per pixel on other two-dimensional array processors (e.g. CLIP-4). The invention computes table-lookup values for a 3×3 binary window for the entire image in one machine cycle, when the number of cells is equal to the number of pixels. Other two-dimensional array processors require nine machine cycles for the same task, and pipelined architecture can only use its first cell for computing when there is one table-lookup to be performed.

Another advantage of the invention is that it applies to the case when the number of cells (M*M) is less than the number of pixels (N*N) with the ratio of N to M equal to powers of 2. Performance is linearly proportional to the ratio M/N (e.g., it requires N/M machine cycles). Other two-dimensional array processors can not accomplish this without significant amounts of input/output (I/O) mechanism.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 10 is the truth table of the router PLA.

DESCRIPTION OF A PREFERRED EMBODIMENT OF THE INVENTION

Dichotomy Adress Generation

Figure 1:
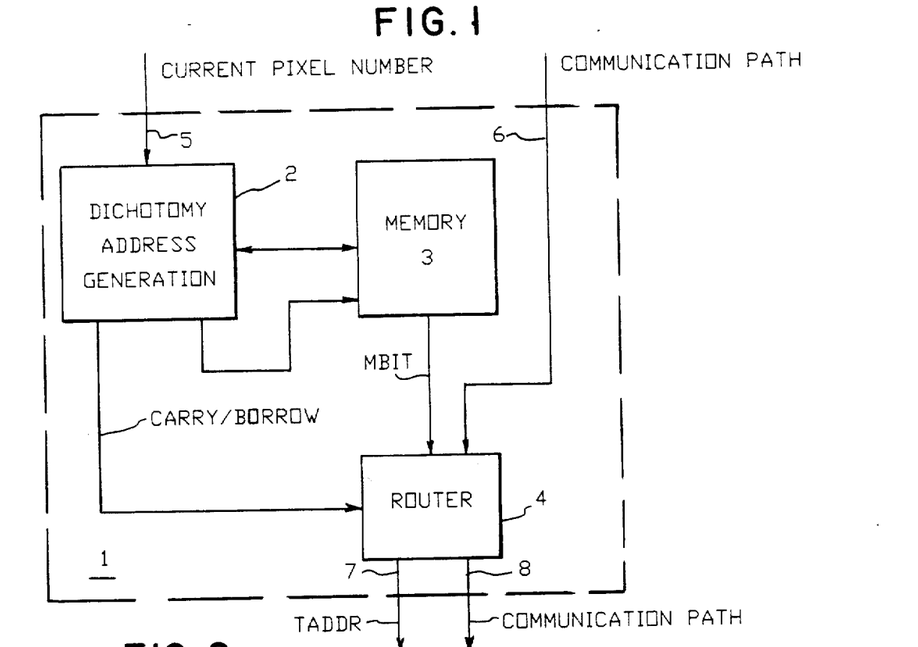
FIG. 1 is a functional diagram of the dichotomy window generation mechanism of the invention, showing major components of the dichotomy address generation.

FIG. 1 shows the Communicator 1, with Dichotomy Address Generation (DAG) mechanism 2, Memory 3 and Router 4 required for each Processing Element (PE) cell in the array which is to have the capability of single cycle table lookup of a window image. In the operation according to the invention, the communicator receives a current pixel number as input to the Dichotomy Address Generation mechanism 2, accesses Memory 3 for the required table address information. The DAG mechanism 2 provides carry/borrow information which is to be concatenated with the table address information from Memory 3 and forwarded via the Router 4 as table address bits for a lookup table.

Figure 2:
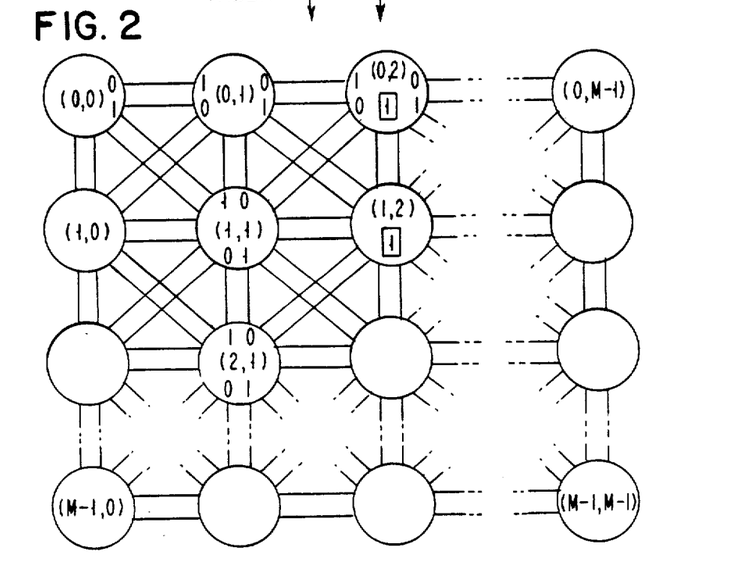
FIG. 2 is a generalized diagram showing organization of an M×M 2D array.

An M×M 2D array is organized as shown in FIG. 2. Each cell of the array is denoted by (i, j) where i and j are between 0 and M−1. The cell in the upper-left corner is denoted as (0,0) while the cell in the lower-right corner is denoted as (M−1, M−1). The top row, row 0, includes cells (0,0), 0,1), (0,2) . . . (0,M-1). Each cell is equipped with a communicator, as shown in representative cells (0,2) and (1,2) by the small box with the reference character 1.

Each cell communicates with its eight neighboring cells through sixteen communication paths, of which two paths are for each pair of adjacent cells. The two communication paths are named port 0 and port 1, where port 0 is the major receiving port and port 1 is the major sending port. These ports are identified in representative cells (0,1), (0,2), (1,1) and (2,1). More specifically, when one bit is to be transmitted, it is sent on sender's port 1 and received on receiver's port 0; when two bits are to be sent, they are sent from sender's port 1 and port 0 and received on receiver's port 0 and port 1.

Figure 3:
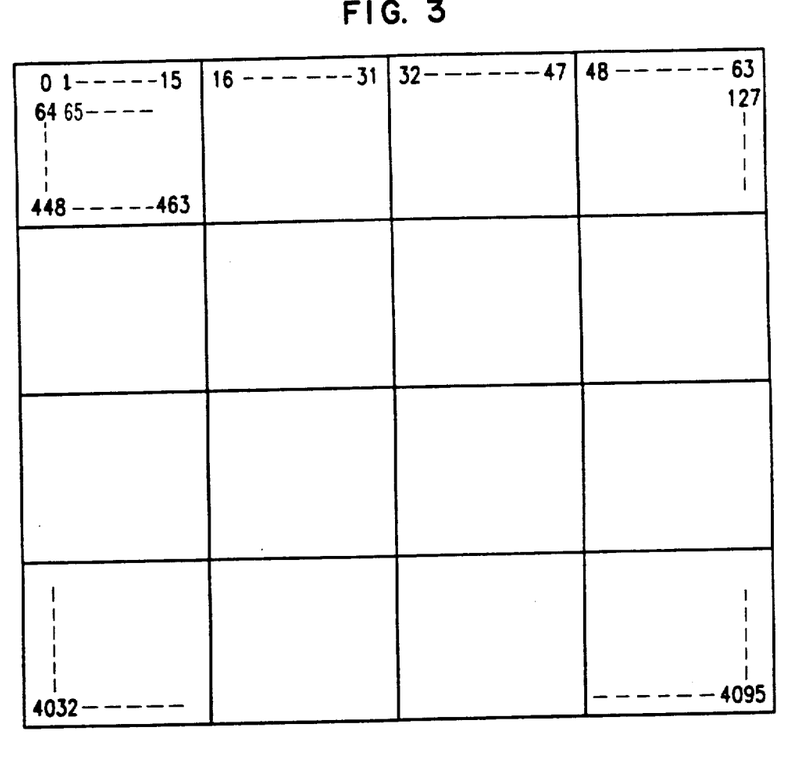
FIG. 3 is a chart showing a 64×64 image is decomposed into 16 subimages each.
Figure 4:
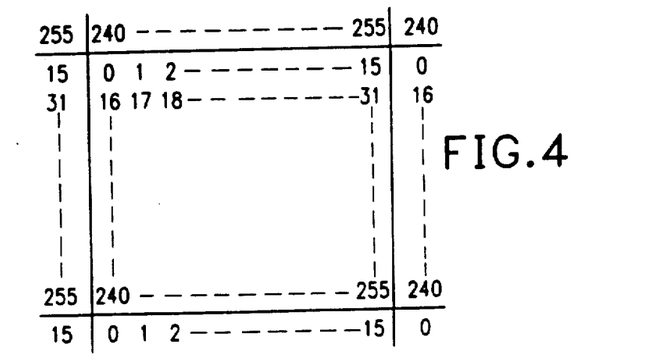
FIG. 4 illustrates the renumbering of each 16×16 subimage from 0 to 255. It also shows the boundary of neighboring subimages.

FIG. 3 and FIG. 4 together show the image and subimage addresses. An N×N image is decomposed into M*M subimages, each with size N/M×N/M as shown in FIG. 3, using N=64 and M=4 as an example. With such decomposition, the numbering of the pixels in each subimage is shown in FIG. 4, using N=64 and M=4 as an example. In the same figure, the numbering of the neighboring rows and columns of the neighboring cells are also shown to facilitate the explanation of the Dichotomy Window Generation (DWG) scheme to be described immediately.

The DWG scheme uses three functional blocks: the Dichotomy Address Generation block 2, the memory block 3, and the router block 4; as shown in FIG. 1. Functional specification of each block is given below. Before describing the functon of each block, an example is given to demonstrate the DWG scheme.

Example to Demonstrate DWG Scheme

Referring to FIG. 3, a 64×64 image is decomposed and each subimage of size 16×16 is distributed to one cell as shown in FIG. 2. The numbering of pixels of the subimage in each cell is shown in FIG. 4. Concentrating on once cell shown in FIG. 5, this example demonstrates the formulation of a 3×3 window centered at pixel "0."

Dichotomy Address Generation

Figure 5:
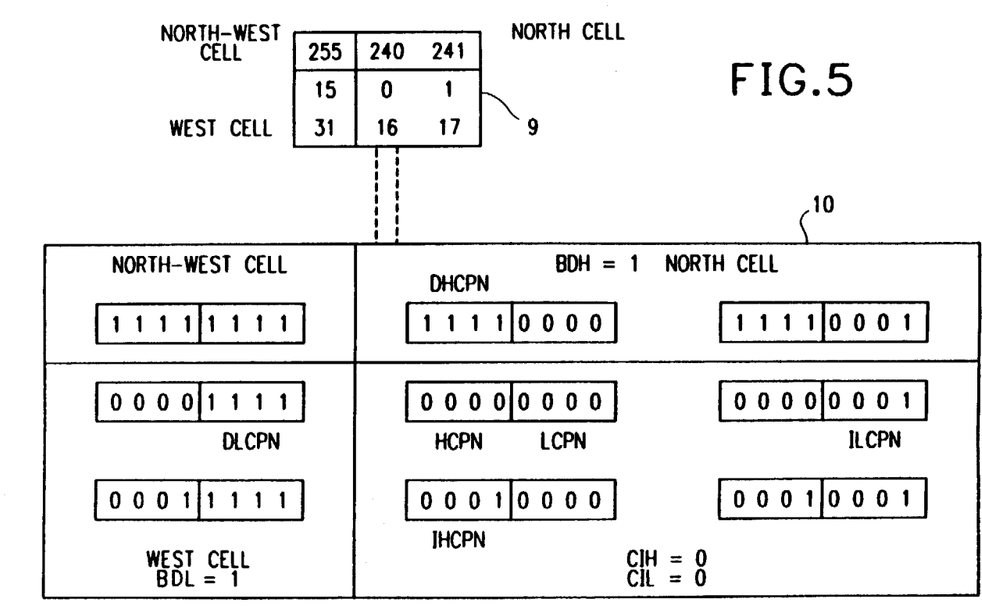
FIG. 5 is a composite chart of a 3×3 window of pixel positions for a window centered at pixel position 0, in decimal numbering and in binary numbering.

FIG. 5 illustrates the decimal version 9 and the binary version 10 of the window corresponding to the addresses generated by the DWG technique in the preferred embodiment.

Since there are 256 pixels in a 16×16 subimage, eight bits are required to represent the Current Pixel Number (CPN=00000000). The CPN is dichotomized into two four-bit parts: the HCPN=0000 and the LCPN=0000. Each four-bit part is altered separately with a forced carry and with a forced borrow so as to provide three different values. HCPN is increased by 1 to produce IHCPN=0001 and a carry CIH=0, also decreased by 1 to produce DHCPN=1111 and a borrow bit BDH=1. Similarly, LCPN is increased by 1 to produce ILCPN=0001 and a carry bit CIL=0, also decreased by 1 to produce DLCPN=1111 and a borrow bit BDL=1. The eight-bit value is thus used to provide six different table addresses for table lookup.

Memory

To extract the nine window pixels from the memory, IHCPN, HCPN, DHCPN, ILCPN, LCPN and DLCPN are utlized as the addresses to the memory which has four banks each having eight words with width 32 bits. The eight-bit address, which normally can access only 256 bits, thus is used as amplified by the DWG scheme to access 4×8×32=1024 bits.

Figure 6:
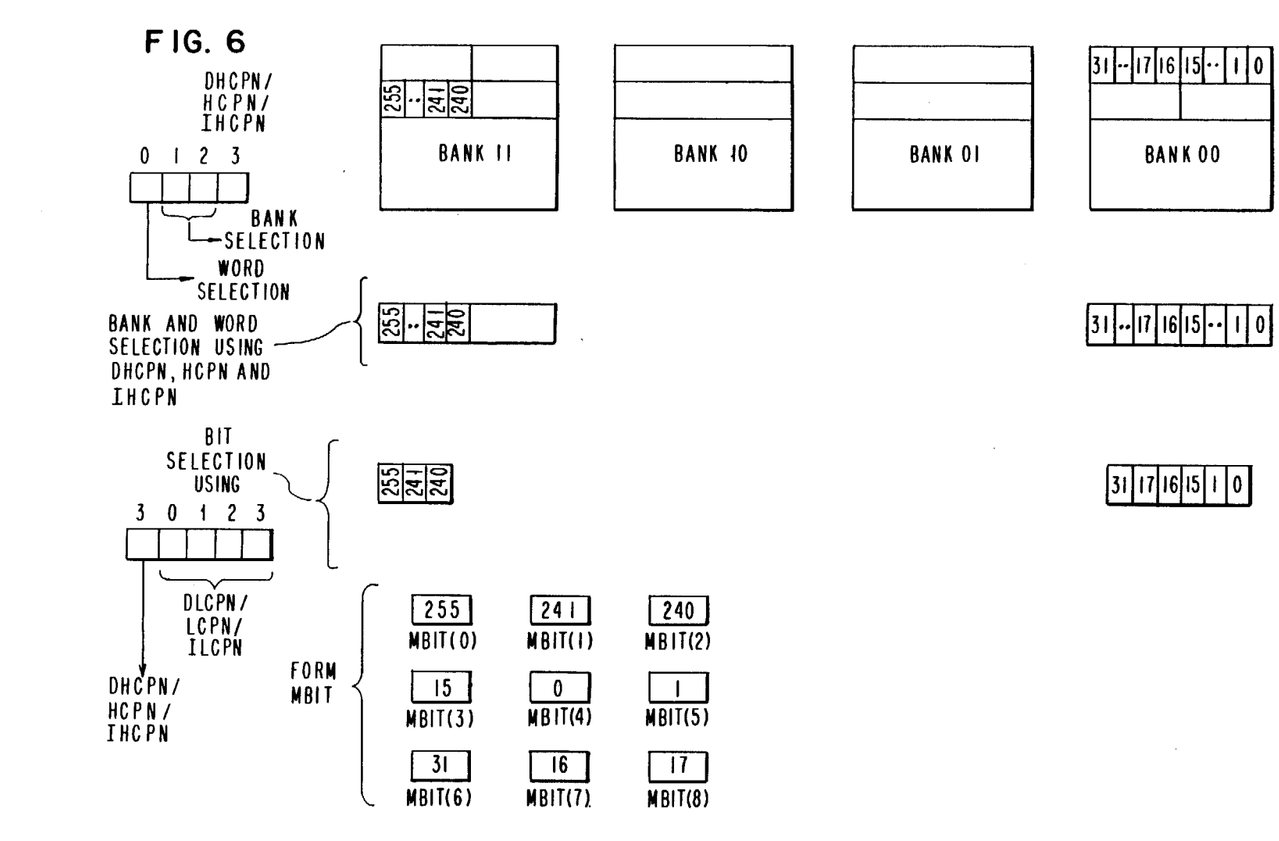
FIG. 6 is a chart showing extraction of nine window pixels from memory using dichotomy addresses.

FIG. 6 shows the locations of the pixels in the memory. To extract the top row of the window (i.e. pixels 255, 240 and 241), bit 1 and bit 2 of DHCPN (i.e. 11) are used to determine that bank11 holds these pixels. Bit 0 of DHCPN (i.e. 1) is used to determine that word 1 of bank11 holds the pixels in the top row of the window. Finally, Bit 3 of DHCPN concatenated with DLCPN (i.e. 11111) is used to locate pixel 255; bit 3 of DHCPN concatenated with LCPN (i.e. 10000) is to locate pixel 240 and bit 3 of DHCPN and ILCPN (i.e. 10001) is to locate pixel 241.

Replacing DHCPN by HCPN and follow the same procedure described in the last paragraph, the middle row of the window (i.e. pixels 15, 0 and 1) can be extracted. That is that pixel 15 is in bank00, word 0 and location 01111 while pixel 0 is in bank00, word 0, location 00000, and pixel 1 in bank00, word 0, location 00001.

Similarly, by using IHCPN instead of DHCPN, the bottom row of the window (i.e. pixel 31, 16 and 17) can be extracted from memory.

The pixels extracted from the memory are organized in MBIT(0) to MBIT(8) as shown in FIG. 6.

Router

Depending on where the center of the window is located, the MBIT may not be the appropriate pixels for table-lookup. For example, when pixel "0" is the center of the window, pixels 240 and 241 belong to the subimage to the north. In the same case, pixel 255 belongs to the subimage in North-West while pixels 15 and 31 belong to the subimage in the West. The information of in which subimage the appropriate pixel resides is completely specified by the carry and borrow bits CIH, CIL, BDH and BDL.

The information CIH=0, CIL=0, BDH=1 and BDL=1 indicates that the center of the window is in upper-left corner, consequently, pixels 240 and 241 must be received from cells to the North, pixel 255 must be received from cell to the North-West, and pixels 15 and 31 must be received from the cell to the West. The rest of the pixels in the window are in its own memory (or now held in MBIT). Besides the receiving, this cell must send its pixels 240 and 241 (or MBIT(1) and MBIT(2)) to the cell to the South, pixel 255 (MBIT(0)) to the cell to the South-East, and pixels 15 and 31 (MBIT(3) and MBIT(6)) to the cell to the East.

Figure 7:
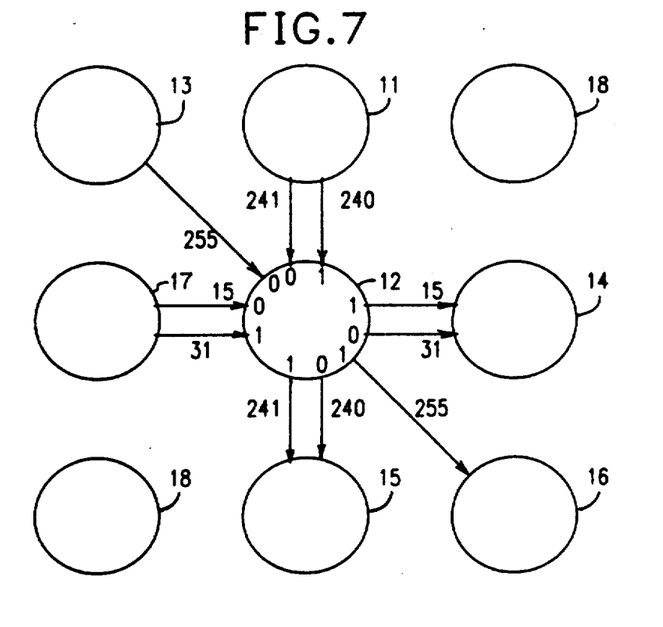
FIG. 7 is a chart showing a routing pattern corresponding to carry and borrow bits (CIH=CIL=0 and BDH32 BDL=1).

FIG. 7 shows a representative routing pattern, corresponding to (CIH=CIL=0 and BDH=BDL=0). Within each cell, the resulting nine bits used to address the table (TADDR(0) to TADDR(8). Exemplary cells 11–17 are marked to show the representative routing pattern. Cell 11 connects pixels 240–241 to cell 12; cell 13 connects pixel 255 to cell 12. Cell 12 connects to cells 14–17, distributing pixels 15, 31, 240, 241 and 255 as marked in FIG. 7. Cells 18 are quiescent.

Figure 8:
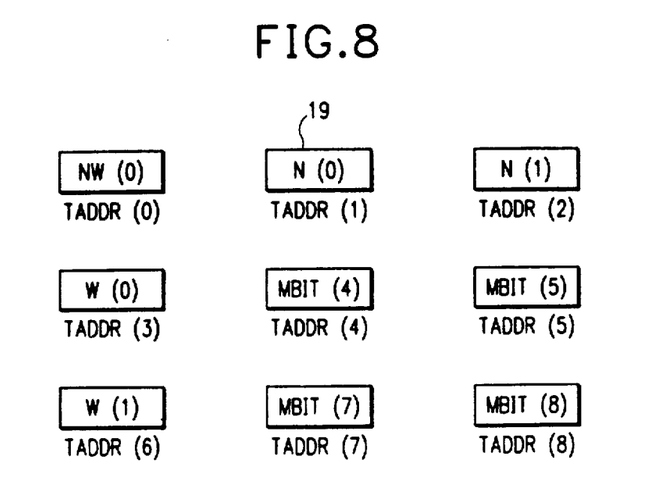
FIG. 8 is a chart showing generation of table address bits after routing.

FIG. 8 is a chart showing generation of table address bits after routing. For example, N(0) box 19 provides a table address which denotes Port 0 linking to the cell to the north. Other boxes provide other table addresses which denote other ports linked to other cells, such as box W(1), which denotes Port 1 linked to the cell to the west.

Keeping in mind the example, and the block diagram in FIG. 1, the operation is explained in the following three blocks—Dichotomy Address Generation, Memory, and Router.

Block 2: Dichotomy Address Generation

The DAG block dichotomizes a k-bit Current Pixel Number (CPN or CPN<0: k−1> and k is even) into High CPH (HCPN) and Low CPN (LCPN) where HCPN equals to CPN<0: k/2−1> and LCPN equals to CPN<k/2: k−1>. In a N/M×N/M subimage, k is equal to log (N/M×N/M). by k bits.

After the dichotomy, DAG increments HCPN and LCPN by 1 to produce IHCPN and ILCPN. In addition to the increment, DAG also decreases HCPN and LCPN by 1 to produce DHCPN and DLCPN. Both the increment and the decrement are confined to k/2-bit arthmetic, and Carry and Borrow bits are produced from the increment and decrement respectively. Therefore, along with IHCPN, we have CIH (for Carry). By the same token, we have CIL along with the production of ILCPN, and BDH and BDL along with the production of DHCPN and DLCPN.

Block 3: Memory

The above-mentioned addresses (HCPN, IHCPN, DHCPN, LCPN, ILCPN and DLCPN) and utilized to access memory and produce nine memory bits (MBIT) which are further used in accessing the lookup table.

Figure 9:
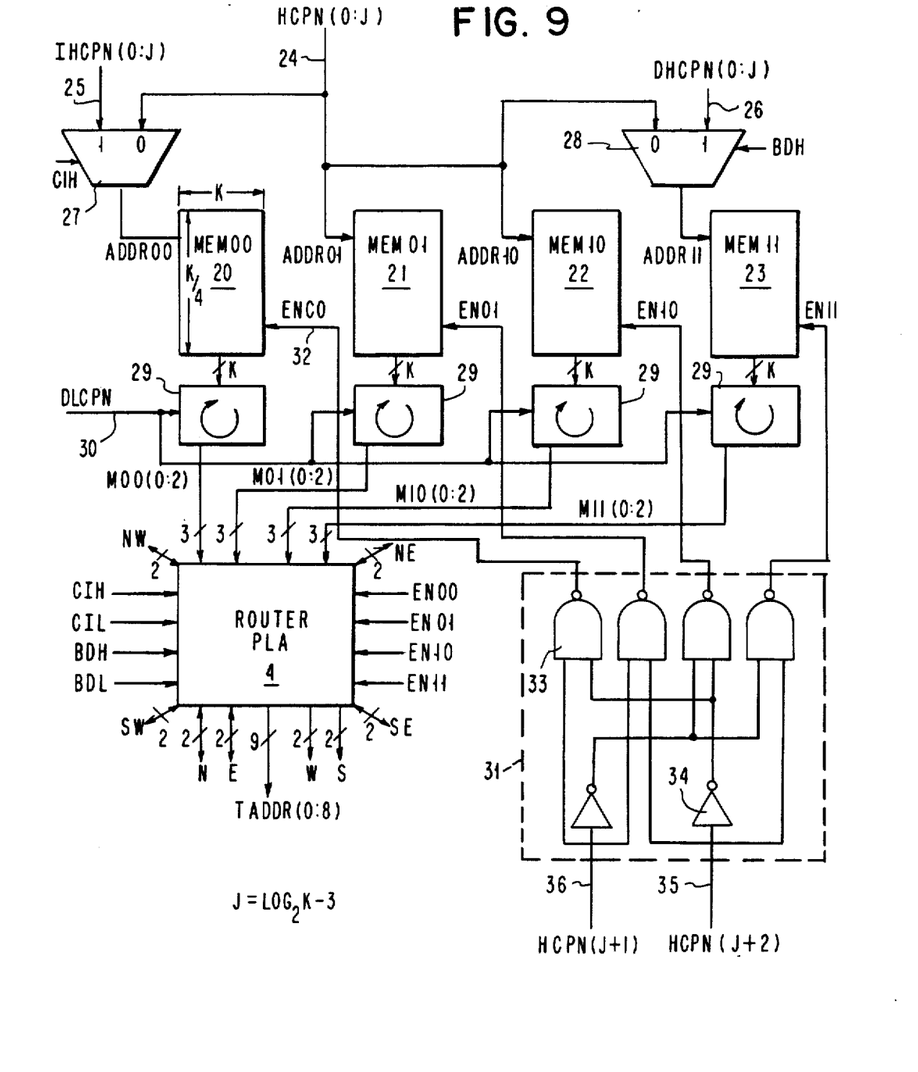
FIG. 9 is a schematic diagram of the memory block and router implemented as a programmed logic array (PLA).

As shown in FIG. 6 and FIG. 9, the memory consists of four banks (designated as MEM00, MEM01, MEM10, and MEM11) each being k-bit wide and at least k/4 words deep to accommodate a k×k or smaller subimage. Each bank accepts one address (designated as ADDR00, ADDR01, ADDR10 and ADDR11) and produces one k-bit datum (designated as M00, M01, M10 and M11).

Each of M00, M01, M10 and M11 is passed to a k-bit-wide barrel shifter to produce three output bits which are the leftmost three outputs of the barrel shifter and are designated as M00(012), M01(012), M10(012) and M11(012) respectively. The barrel shifter is controlled by DLCPN whose value controls the number of bits to be shifted and whose sign controls the direction of the shifting; a positive sign means shifting left while a negative sign means shifting right. A barrel shifter is a regular digital component whose function can be found in any TTL design books from semiconductor manufacturer such as Texas Instruments Corporation.

Each memory bank is controlled by an "enable bit" called EN00, EN01, EN10 and EN11 separately. When "enable bit" is '1', the memory will be selected.

FIG. 9 shows the detailed circuitry by which the "enable bits" are derived from HCPN. Router 4 is implemented as a programmable logic array as described supra. Memory (3 in FIG. 1) is divided into four banks 20-23, MEM00 . . . MEM11. Memory address values are provided on lines 24-26, as incremented or decremented by circuits 27,28 in response to signal CIH and signal BDH, respectively. The four memory banks each provide output through a barrel shifter 29 as controlled by signal DLCPN on line 30. The four memory banks 20-23 are respectively enabled by signals EN00 . . . EN11 provided by logic 31 on lines 32. Logic 31 includes AND circuits 33 and power inverters 34; logic 31 responds in turn to signals HCPN (J+2) AND HCPN (J+1) on respective lines 35 and 36 to make the requisite enabling signals.

Block 4: Router

The 12 memory bits (M00(0:2), M01(0:2), M10(0:2), and M11(0:2)) generated in the memory block are to be used locally or sent to neighboring cells to form the address of a table (TADDR (0=8)). This is done by the router which is implemented as a PLA, whose truth table appears in three charts as follows:

| | | | | | | | | | | | | |
|---|---|---|---|---|---|---|---|---|---|---|---|---|
| 0 | 0 | 0 | 0 | 0 | 0 | 0 | 0 | 0 | 0 | 0 | 0 | CIH |
| — | — | — | — | 0 | 0 | 0 | 0 | 0 | 0 | 0 | 0 | CIL |
| — | — | — | — | — | — | — | — | — | — | — | — | BDH |
| 0 | 0 | 0 | 0 | 0 | 0 | 0 | 0 | — | — | — | — | BDL |
| — | — | — | 0 | — | — | — | 0 | — | — | — | 0 | EN00 |
| — | — | 0 | — | — | — | 0 | — | — | — | 0 | — | EN01 |
| — | 0 | — | — | — | 0 | — | — | — | 0 | — | — | EN10 |
| 0 | — | — | — | 0 | — | — | — | 0 | — | — | — | EN11 |
| N(1) | N(1) | N(1) | N(1) | NW(0) | NW(0) | NW(0) | NW(0) | NW(0) | NW(0) | NW(0) | NW(0) | TADDR(0) |
| N(0) | N(0) | N(0) | N(0) | N(0) | N(0) | N(0) | N(0) | N(0) | N(0) | N(0) | N(0) | TADDR(1) |
| NE(0) | NE(0) | NE(0) | NE(0) | N(1) | N(1) | N(1) | N(1) | N(1) | N(1) | N(1) | N(1) | TADDR(2) |
| M01(0) | M00(0) | M11(0) | M10(0) | M01(0) | M00(0) | M11(0) | M10(0) | W(0) | W(0) | W(0) | W(0) | TADDR(3) |
| M01(1) | M00(1) | M11(1) | M10(1) | M01(1) | M00(1) | M11(1) | M10(1) | M01(1) | M00(1) | M11(1) | M10(1) | TADDR(4) |
| E(0) | E(0) | E(0) | E(0) | M01(2) | M00(2) | M11(2) | M10(2) | M01(2) | M00(2) | M11(2) | M10(2) | TADDR(5) |
| M10(0) | M01(0) | M00(0) | M11(0) | M10(0) | M01(0) | M00(0) | M11(0) | W(1) | W(1) | W(1) | W(1) | TADDR(6) |
| M10(1) | M01(1) | M00(1) | M11(1) | M10(1) | M01(1) | M00(1) | M11(1) | M10(1) | M01(1) | M00(1) | M11(1) | TADDR(7) |
| E(1) | E(1) | E(1) | E(1) | M10(2) | M01(2) | M00(2) | M11(2) | M10(2) | M01(2) | M00(2) | M11(2) | TADDR(8) |
| | | | | | | | | | | | | N(0) |
| | | | | | | | | | | | | N(1) |
| | | | | | | | | | | | | E(0) |
| | | | | | | | | | M01(0) | M00(0) | M11(0) | M10(0) | E(1) |
| | | | | | | | | | | | | W(0) |
| M10(2) | M01(2) | M00(2) | M11(2) | | | | | | | | | W(1) |
| M01(2) | M00(2) | M11(2) | M10(2) | | | | | | | | | |
| M00(0) | M11(0) | M10(0) | M01(0) | M00(2) | M11(2) | M10(2) | M01(2) | M00(2) | M11(2) | M10(2) | M01(2) | S(0) |
| M00(1) | M11(1) | M10(1) | M01(1) | M00(1) | M11(1) | M10(1) | M01(1) | M00(1) | M11(1) | M10(1) | M01(1) | S(1) |
| | | | | | | | | | | | | NE(0) |
| | | | | | | | | | | | | NE(1) |
| | | | | | | | | | | | | NW(0) |
| | | | | | | | | | | | | NW(1) |
| | | | | | | | | | M00(0) | M11(0) | M10(0) | M01(0) | SE(0) |
| | | | | E(0) | E(0) | E(0) | E(0) | | | | | SE(1) |
| | | | | | | | | | | | | SW(0) |
| M00(2) | M11(2) | M10(2) | M01(2) | | | | | | | | | SW(1) |
| 0 | 0 | 0 | 0 | 0 | 0 | 0 | 0 | 0 | 0 | 0 | 0 | CIH |
| — | — | — | — | 0 | 0 | 0 | 0 | 0 | 0 | 0 | 0 | CIL |
| 0 | 0 | 0 | 0 | 0 | 0 | 0 | 0 | 0 | 0 | 0 | 0 | BDH |
| 0 | 0 | 0 | 0 | 0 | 0 | 0 | 0 | — | — | — | — | BDL |
| — | — | — | 0 | — | — | — | 0 | — | — | — | 0 | EN00 |
| — | — | 0 | — | — | — | 0 | — | — | — | 0 | — | EN01 |
| — | 0 | — | — | — | 0 | — | — | — | 0 | — | — | EN10 |
| 0 | — | — | — | 0 | — | — | — | 0 | — | — | — | EN11 |
| M00(0) | M11(0) | M10(0) | M01(0) | M00(0) | M11(0) | M10(0) | M01(0) | | | | W(1) | TADDR(0) |
| M00(1) | M11(1) | M10(1) | M01(1) | M00(1) | M11(1) | M10(1) | M01(1) | M00(1) | M11(1) | M10(1) | M01(1) | TADDR(1) |
| E(1) | E(1) | E(1) | E(1) | M00(2) | M11(2) | M10(2) | M01(2) | M00(2) | M11(2) | M10(2) | M01(2) | TADDR(2) |
| M01(0) | M00(0) | M11(0) | M10(0) | M01(0) | M00(0) | M11(0) | M10(0) | | | | W(0) | TADDR(3) |
| M01(1) | M00(1) | M11(1) | M10(1) | M01(1) | M00(1) | M11(1) | M10(1) | M01(1) | M00(1) | M11(1) | M10(1) | TADDR(4) |
| E(0) | E(0) | E(0) | E(0) | M01(2) | M00(2) | M11(2) | M10(2) | M01(2) | M00(2) | M11(2) | M10(2) | TADDR(5) |
| M10(0) | M01(0) | M00(0) | M11(0) | M10(0) | M01(0) | M00(0) | M11(0) | | | | SW(0) | TADDR(6) |
| M10(1) | M01(1) | M00(1) | M11(1) | M10(1) | M01(1) | M00(1) | M11(1) | M10(1) | M01(1) | M00(1) | M11(1) | TADDR(7) |
| SE(0) | SE(0) | SE(0) | SE(0) | M10(2) | M01(2) | M00(2) | M11(2) | M10(2) | M01(2) | M00(2) | M11(2) | TADDR(8) |
| | | | | | | | | | | | | N(0) |
| | | | | | | | | | | | | N(1) |
| | | | | | | | | | M00(0) | M11(0) | M10(0) | M01(0) | E(0) |
| | | | | | | | | | M01(0) | M00(0) | M11(0) | M10(0) | E(1) |
| | | | | | | | | | | | | W(0) |
| | N00(2) | M11(2) | M10(2) | M01(2) | | | | | | | | W(1) |
| | M01(2) | M00(2) | M11(2) | M12(2) | | | | | | | | S(0) |
| | M10(2) | M01(2) | M00(2) | M11(2) | | | | | M10(0) | M01(0) | M00(0) | M11(0) | S(1) |
| | | | | | | | | | | | | NE(0) |
| | | | | | | | | | | | | NE(1) |

-continued

| | | | | | | | | | | | | |
|---|---|---|---|---|---|---|---|---|---|---|---|---|
| N(0) | N(0) | N(0) | N(0) | | | | | | | | | NW(0) |
| | | | | | | | | | | | | NW(1) |
| | | | | | | | | | | | | SE(0) |
| | | | | | | | | | | | | SE(1) |
| | | | | | | | | | | | | SW(0) |
| | | | | | | | | | | | | SW(1) |
| — | — | — | — | — | — | — | — | — | — | — | — | CIH |
| — | — | — | — | 0 | 0 | 0 | 0 | 0 | 0 | 0 | 0 | CIL |
| 0 | 0 | 0 | 0 | 0 | 0 | 0 | 0 | 0 | 0 | 0 | 0 | BDH |
| 0 | 0 | 0 | 0 | 0 | 0 | 0 | 0 | — | — | — | — | BDL |
| — | — | — | 0 | — | — | — | 0 | — | — | — | 0 | EN00 |
| — | — | 0 | — | — | — | 0 | — | — | — | 0 | — | EN01 |
| — | 0 | — | — | — | 0 | — | — | — | 0 | — | — | EN10 |
| 0 | — | — | — | 0 | — | — | — | 0 | — | — | — | EN11 |
| M00(0) | M11(0) | M10(0) | M01(0) | M00(0) | M11(0) | M10(0) | M01(0) | W(1) | W(1) | W(1) | W(1) | TADDR(0) |
| M00(1) | M11(1) | M10(1) | M01(1) | M00(1) | M11(1) | M10(1) | M01(1) | M00(1) | W11(1) | M10(1) | M01(1) | TADDR(1) |
| E(1) | E(1) | E(1) | E(1) | M00(2) | M11(2) | M10(2) | M01(2) | M00(2) | M11(2) | M10(2) | M01(2) | TADDR(2) |
| M01(0) | M00(0) | M11(0) | M10(0) | M01(0) | M00(0) | M11(0) | M10(0) | W(0) | W(0) | W(0) | W(0) | TADDR(3) |
| M01(1) | M00(1) | M11(1) | M10(1) | M01(1) | M00(1) | M11(1) | M10(1) | M01(1) | M00(1) | M11(1) | M10(1) | TADDR(4) |
| E(0) | E(0) | E(0) | E(0) | M01(2) | M00(2) | M11(2) | M10(2) | M01(2) | M00(2) | M11(2) | M10(2) | TADDR(5) |
| S(1) | S(1) | S(1) | S(1) | S(1) | S(1) | S(1) | S(1) | SW(0) | SW(0) | SW(0) | SW(0) | TADDR(6) |
| S(0) | S(0) | S(0) | S(0) | S(0) | S(0) | S(0) | S(0) | S(0) | S(0) | S(0) | S(0) | TADDR(7) |
| SE(0) | SE(0) | SE(0) | SE(0) | SE(0) | SE(0) | SE(0) | SE(0) | S(1) | S(1) | S(1) | S(1) | TADDR(8) |
| | | | | M10(0) | M01(0) | M00(0) | M11(0) | | | | | N(0) |
| | | | | M10(1) | M01(1) | M00(1) | M11(1) | | | | | N(1) |
| | | | | | | | | M00(3) | M11(0) | M10(0) | M01(0) | E(0) |
| M00(2) | M11(2) | M10(2) | M01(2) | M10(2) | M01(2) | M00(2) | M11(2) | M01(0) | M00(0) | M11(0) | M10(0) | E(1) |
| M01(2) | M00(2) | M11(2) | M10(2) | | | | | | | | | W(0) |
| | | | | | | | | | | | | W(1) |
| | | | | | | | | | | | | S(0) |
| | | | | | | | | | | | | S(1) |
| | | | | | | | | | | | | NE(0) |
| | | | | | | | | | | | | NE(1) |
| | | | | | | | | | | | | NW(0) |
| M10(2) | M01(2) | M00(2) | M11(2) | W(0) | W(0) | W(0) | W(0) | M10(0) | M01(0) | M00(0) | M11(0) | NW(1) |
| | | | | | | | | | | | | SE(0) |
| | | | | | | | | | | | | SE(1) |
| | | | | | | | | | | | | SW(0) |
| | | | | | | | | | | | | SW(1) |

Thus, while the invention has been described with reference to a preferred embodiment using the Dichotomy Window Generation scheme to develop table addresses from the bits of a 3×3 window, it will be understood by those skilled in the art that various changes in form and details may be made without departing from the scope of the invention, as pointed out in the following claims.

What is claimed is:

1. A method for arbitrarily accessing a window of K×K pixels in a N×N array stored image, in a constant unit memory cycle, comprising the following steps:

decomposing the N×N pixel array image into M×M pixel array subimages of size N/M×N/M, each pixel of the subimage being identifiable by a pixel identifier number and each pixel having communication with each of a plurality of neighboring cells comprising the window via a receiving port and a sending port;

generating a dichotomy address by dividing a current pixel identifier number into a plurality of partial addresses;

manipulating said partial addresses to develop related addresses corresponding to the pixels comprising the window;

concatenating said partial addresses and said related addresses into an expanded address set;

providing a memory table of plural memory banks, each bank having a plurality of words; and addressing said memory table by said expanded address set to extract from said memory table a plurality of words defining the bits of the window.

2. A method for arbitrarily accessing a window of K×K pixels in a N×N pixel array stored image, in a constant unit memory cycle, comprising the following steps:

decomposing the N×N pixel array image into M×M pixel array subimages of size N/M×N/M;

dichotomy address generating, by dividing the current pixel number CPN into ($\frac{1}{2}$)*log (N/M) high and low address halves HCPN and LCPN;

incrementing address HCPN to produce address IHCPN and a carry bit CIH;

decrementing address HCPN to produce address DHCPN and a borrow bit BDH;

incrementing address LCPN to produce address ILCPN and a carry bit CIL;

decrementing address LCPN to produce address DLCPN and a borrow bit BDL;

providing a memory table of four memory banks 00,01,10,11, each bank having eight words;

extracting from the memory table four 32-bit words, and from those four words selecting nine bits (MBIT0:8), addressed as a function of bit value concatenations of selected addresses of IHCPN, HCPN, DHCPN, ILCPN, LCPN and DLCPN, to be used as a table address in further processing; and routing, under control of bits CIH, CIL, BDH and BDL, the nine selected-memory-extracted bits (MBIT0:8) and sixteen neighborhood bits N(0:1), S(0:1), W(0:1), E(0:1), NW(0:1), NE(0:1), SW(0:1) and SE(0:1) to produce nine table address bits TADDR(0:8) and the sixteen neighborhood bits to organize the bits into 3×3 neighborhood presentation.

3. A method for arbitrarily accessing a window of $K \times K$ pixels in a $N \times N$ array stored image, in a constant unit memory cycle, comprising the following steps:

providing a pixel indicator number for each pixel in the array;

manipulating said pixel indicator number to provide a plurality of subimage addresses;

manipulating each of said subimage addresses to provide a multiplicity of related subimage addresses; and     concatenating said subimage addresses and said related subimage addresses to address a table for pixel values of the window pixels.

* * * * *